United States Patent
Noguchi et al.

(10) Patent No.: US 9,356,284 B2
(45) Date of Patent: May 31, 2016

(54) ACTIVE MATERIAL FOR SECONDARY BATTERY

(75) Inventors: Takehiro Noguchi, Tokyo (JP); Hideaki Sasaki, Tokyo (JP); Makiko Uehara, Tokyo (JP); Yuukou Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 40 days.

(21) Appl. No.: 14/130,056

(22) PCT Filed: Jun. 15, 2012

(86) PCT No.: PCT/JP2012/065309
§ 371 (c)(1),
(2), (4) Date: Dec. 30, 2013

(87) PCT Pub. No.: WO2013/008581
PCT Pub. Date: Jan. 17, 2013

(65) Prior Publication Data
US 2014/0138575 A1 May 22, 2014

(30) Foreign Application Priority Data
Jul. 13, 2011 (JP) .................................. 2011-154753

(51) Int. Cl.
| H01M 4/485 | (2010.01) |
| H01M 4/36 | (2006.01) |
| H01M 4/505 | (2010.01) |
| H01M 4/525 | (2010.01) |
| H01M 10/0525 | (2010.01) |

(52) U.S. Cl.
CPC .............. *H01M 4/364* (2013.01); *H01M 4/485* (2013.01); *H01M 4/505* (2013.01); *H01M 4/525* (2013.01); *H01M 10/0525* (2013.01); *Y02E 60/122* (2013.01); *Y02P 70/54* (2015.11)

(58) Field of Classification Search
CPC ...................................................... H01M 4/364
See application file for complete search history.

(56) References Cited

FOREIGN PATENT DOCUMENTS

| CN | 1280397 A | 1/2001 |
| JP | 09-147867 | 6/1997 |
| JP | 2996234 | 12/1999 |
| JP | 2000-323140 | 11/2000 |
| JP | 2001-068109 | 3/2001 |
| JP | 2003-229130 | 8/2003 |
| JP | 2005-085720 | 3/2005 |
| JP | 4458232 | 4/2010 |

OTHER PUBLICATIONS

English machine translation of JP 2005-085720A (2005).*
English machine translation of JP 2001-068109A (2001).*
Fey et al., Preparation and electrochemical properties of high-voltage cathode materials, LiMyNi0.5-yMn1.5O4 (M=Fe, Cu, Al, Mg; y=0.0-0.4; Journal of Power Sources, 115 (2003) 332-345.*
Zhonghua Lu et al., "Structure and Electrochemistry of Layered Li[Cr$_x$Li$_{(1/3-x/3)}$Mn$_{(2/3-2x/3)}$]O$_2$", Journal of the Electrochemical Society, 149(11), pp. A1454-A1459, 2002.
Zhonghua Lu et al., "Layered Cathode Materials Li[Ni$_x$Li$_{(1/3-2x/3)}$Mn$_{(2/3-x/3)}$]O$_2$ for Lithium-Ion Batteries", Electrochemical and Solid-State Letters, 4(11), pp. A191-A194, 2001.
International Search Report mailed Sep. 11, 2012.
Office Action issued by the Chinese Patent Office in counterpart Chinese Patent Application No. 201280034706.9, dated Jun. 1, 2015.

* cited by examiner

*Primary Examiner* — Peter F Godenschwager
(74) *Attorney, Agent, or Firm* — Finnegan, Henderson, Farabow, Garrett & Dunner LLP

(57) ABSTRACT

An active material for a secondary battery whose lifetime characteristics are improved is provided. The active material for a secondary battery includes a first active material represented by $Li_p[M1_mM2_{2-m-n}M3_n]O_4$, wherein M1 is at least one selected from Ni, Cr, Fe, Co, and Cu; M2 is at least one selected from Mn, Ti, and Si, and contains Mn; M3 is at least one selected from Li, B, Mg, Al, Na, and Ca; and $0 \leq p$, $0 < m$, $0 < n$, and $m+n<2$; and a second active material represented by $Li_q[Li_aX_xZ_zMn_{1-a-x-z}]O_2$, wherein X is at least one selected from Ni, Cr, Fe, Co, and Cu; Z is at least one selected from Al, Mg, B, Si, Na, Ca, and Ti; and $0 \leq q$, $0 < a$, $0 < x$, $0 \leq z$, and $a+x+z<1$.

19 Claims, 1 Drawing Sheet

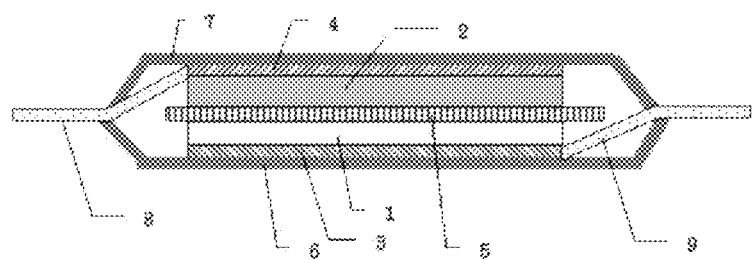

ACTIVE MATERIAL FOR SECONDARY BATTERY

CROSS-REFERENCE TO RELATED PATENT APPLICATIONS

This application is a National Stage Entry of International Application No. PCT/JP2012/065309, filed Jun. 15, 2012, which claims priority from Japanese Patent Application No. 2011-154753, filed Jul. 13, 2011. The entire contents of the above-referenced applications are expressly incorporated herein by reference.

TECHNICAL FIELD

An exemplary embodiment relates to an active material for a secondary battery.

BACKGROUND ART

A lithium secondary battery and a lithium-ion secondary battery (hereinafter referred to as a secondary battery) have features of being small and having large capacity, and are widely used as a power source of a cellular phone, a laptop computer or the like.

Currently, as an active material for a secondary battery, lithium cobalt oxide ($LiCoO_2$) is mainly used for a positive electrode. However, since the safety in a charged state of $LiCoO_2$ is not always sufficient and the price of a Co raw material is high, the search for a new alternative active material for a secondary battery has been promoted.

Meanwhile, as a method for increasing an energy density of a secondary battery, a method for increasing an operating potential of a secondary battery is effective. In a secondary battery using lithium cobalt oxide or lithium manganese oxide as an active material for a positive electrode, an operating potential is a 4 V class (average operating potential=3.6 to 3.8 V: vs. lithium potential). This is because a generated potential is defined by a redox reaction of a Co ion or a Mn ion ($Co^{3+} \leftarrow \rightarrow Co^{4+}$ or $Mn^{3+} \leftarrow \rightarrow Mn^{4+}$).

In contrast, it is known that a 5 V-class operating potential can be realized by using, for example, a compound having a spinel structure (spinel compound), in which Mn of lithium manganese oxide is replaced by Ni or the like, as an active material. Specifically, it is known that a potential plateau is shown in a region of 4.5 V or more by using a spinel compound of $LiNi_{0.5}Mn_{1.5}O_4$ or the like (Patent Literature 1). Mn exists in a tetravalent state in such a spinel compound, and an operating potential is defined by redox of $Ni^{2+} \leftarrow \rightarrow Ni^{4+}$ instead of redox of $Mn^{3+} \leftarrow \rightarrow Mn^{4+}$. Moreover, it is known that, similarly, $Li[CoMn]O_4$, $Li[Fe_{0.5}Mn_{1.5}]O_4$, $Li[CrMn]O_4$, $Li[Cu_xMn_{2-x}]O_4$ or the like charges and discharges at a potential of 4.5 V or more with respect to Li metal. $Li[Ni_{0.5}Mn_{1.5}]O_4$ has capacity of 130 mAh/g or more and an average operating voltage of 4.6 V or more with respect to Li metal. In the case of using $Li[Ni_{0.5}Mn_{1.5}]O_4$, an energy density that can be stored in a positive electrode is higher than that of $LiCoO_2$. Furthermore, a spinel compound of $Li[Ni_{0.5}Mn_{1.5}]O_4$ or the like can obtain an energy density of 90% or more even at a low temperature, for example, at −20° C. A spinel compound can be used at a wide range of temperatures and charge-discharge rates because of its high ion conductivity.

Examples of other active materials for a secondary battery with a high energy density include composite oxides having a layered structure mainly containing Ni, such as $LiNiO_2$ and $Li[Ni_{0.8}Co_{0.2}]O_2$. Although these materials have a feature of having high discharge capacity of about 200 mAh/g, its crystal stability when being charged is low and reliability of a battery in a charged state remains a problem. In addition, since these materials have a charge-discharge range of about 3 V to 4.3 V and a region of 3.8 V or less is especially large, these materials have a low potential compared to a secondary battery using $LiCoO_2$.

Furthermore, as other active materials for a secondary battery with a high energy density, active materials having a layered structure, such as $Li[Cr_xLi_{(1/3-x/3)}Mn_{(2/3-2x/3)}]O_2$ and $Li[Ni_xLi_{(1/3-2x/3)}Mn_{(2/3-x/3)}]O_2$, are reported (Non Patent Literature 1, Non Patent Literature 2). These materials are represented by a form of $LiMO_2$, and are materials having a layered structure of a Li layer, an M layer, and an O layer. Since these materials have a charge termination voltage of about 4.8 V, which is higher than that of other active materials having a layered structure, these materials have a feature of having a high energy density. However, although these materials can obtain high capacity of 200 mAh/g or more at a high temperature of 45° C. and a low charge-discharge rate of 0.025 C, capacity is decreased by about 10 to 30% at a low temperature of 20° C. and a high charge-discharge rate of 0.5 C or more. It is supposed that this is due to low ion conductivity and electron conductivity of a layered structure containing Mn.

Furthermore, as another technique, a technique in which two kinds of active materials for a secondary battery are mixed to be used is reported. For example, Patent Literature 2 discloses a mixture of $LiMn_2O_4$ and $Li(Ni_xCo_{1-x})O_2$ ($0 \leq x \leq 1$). Moreover, Patent Literature 3 discloses a mixture of a spinel material of $LiNi_{0.5}Mn_{1.5}O_4$ or the like and a material of $Li[Ni_{0.33}Li_{0.1}Mn_{0.57}]O_2$ or the like.

CITATION LIST

Patent Literature

Patent Literature 1: JP09-147867A
Patent Literature 2: JP2996234B
Patent Literature 3: JP4458232B

Non Patent Literature

Non Patent Literature 1: Journal of The Electrochemical Society, 149 (11) A1454-A1459 (2002)
Non Patent Literature 2: Electrochemical and State Letters, 4 (11) A191-A194 (2001)

SUMMARY OF INVENTION

Technical Problem

However, lifetime characteristics of all of the above active materials for a secondary battery are not sufficient, and further improvement of lifetime characteristics is required. It is an object of the exemplary embodiment to provide an active material for a secondary battery whose lifetime characteristics are improved.

Solution to Problem

An active material for a secondary battery according to the exemplary embodiment includes a first active material represented by the following formula (I)

$$Li_p[M1_mM2_{2-m-n}M3_n]O_4 \quad (I)$$

wherein, M1 is at least one selected from the group consisting of Ni, Cr, Fe, Co, and Cu; M2 is at least one selected from the group consisting of Mn, Ti, and Si, and contains at least Mn; M3 is at least one selected from the group consisting of Li, B, Mg, Al, Na, and Ca; and $0 \leq p$, $0 < m$, $0 < n$, and $m+n<2$; and a second active material represented by the following formula (II)

$$Li_q[Li_aX_xZ_zMn_{1-a-x-z}]O_2 \quad (II)$$

wherein, X is at least one selected from the group consisting of Ni, Cr, Fe, Co, and Cu; Z is at least one selected from the group consisting of Al, Mg, B, Si, Na, Ca, and Ti; and $0 \leq q$, $0 < a$, $0 < x$, $0 \leq z$, and $a+x+z<1$.

A method for producing an active material for a secondary battery according to the exemplary embodiment includes mixing a first active material represented by the following formula (I)

$$Li_p[M1_mM2_{2-m-n}M3_n]O_4 \quad (I)$$

wherein, M1 is at least one selected from the group consisting of Ni, Cr, Fe, Co, and Cu; M2 is at least one selected from the group consisting of Mn, Ti, and Si, and contains at least Mn; M3 is at least one selected from the group consisting of Li, B, Mg, Al, Na, and Ca; and $0 \leq p$, $0 < m$, $0 < n$, and $m+n<2$; and a second active material represented by the following formula (II)

$$Li_q[Li_aX_xZ_zMn_{1-a-x-z}]O_2 \quad (II)$$

wherein, X is at least one selected from the group consisting of Ni, Cr, Fe, Co, and Cu; Z is at least one selected from the group consisting of Al, Mg, B, Si, Na, Ca, and Ti; and $0 \leq q$, $0 < a$, $0 < x$, $0 \leq z$, and $a+x+z<1$.

Advantageous Effect of Invention

According to the exemplary embodiment, an active material for a secondary battery whose lifetime characteristics are improved can be provided.

BRIEF DESCRIPTION OF DRAWING

FIG. 1 is a cross-sectional view of one example of a secondary battery according to the exemplary embodiment.

DESCRIPTION OF EMBODIMENT

An active material for a secondary battery according to the exemplary embodiment includes a first active material represented by the following formula (I)

$$Li_p[M1_mM2_{2-m-n}M3_n]O_4 \quad (I)$$

wherein, M1 is at least one selected from the group consisting of Ni, Cr, Fe, Co, and Cu; M2 is at least one selected from the group consisting of Mn, Ti, and Si, and contains at least Mn; M3 is at least one selected from the group consisting of Li, B, Mg, Al, Na, and Ca; and $0 \leq p$, $0 < m$, $0 < n$, and $m+n<2$; and a second active material represented by the following formula (II)

$$Li_q[Li_aX_xZ_zMn_{1-a-x-z}]O_2 \quad (II)$$

wherein, X is at least one selected from the group consisting of Ni, Cr, Fe, Co, and Cu; Z is at least one selected from the group consisting of Al, Mg, B, Si, Na, Ca, and Ti; and $0 \leq q$, $0 < a$, $0 < x$, $0 \leq z$, and $a+x+z<1$.

In the active material for a secondary battery according to the exemplary embodiment, the second active material has larger capacity than the first active material. Therefore, it is one object of mixing the second active material to increase capacity per mass of the active material. In contrast, since the second active material has low ion conductivity and low rate characteristics, a load is put on an electrolyte solution or the like at a high charge-discharge rate and therefore sufficient lifetime characteristics cannot be obtained. Thus, by mixing the first active material that can be used at a high charge-discharge rate and a wide temperature range, a problem of the second active material having low ion conductivity can be redeemed. Furthermore, by mixing the second active material having a high energy density with the first active material to be used, prolongation of lifetime of a secondary battery can be ensured at a wide range of charge-discharge rates and a wide range of temperatures.

In the case of $0.4 \leq m<1.1$ in the above formula (I), the first active material represented by the formula (I) is an active material called 5 V-class spinel, and is doped with at least one selected from the group consisting of Li, B, Mg, Al, Na, and Ca. In contrast, the second active material represented by the above formula (II) is an active material containing Mn and having a layered structure.

The 5 V-class spinel is characterized by releasing and absorbing Li at a voltage range of from 4.5 V to 5.2 V with respect to Li. Moreover, the 5 V-class spinel is inexpensive because of mainly containing Mn, and has high safety as a secondary battery because the crystal stability during releasing Li when being charged is high. Furthermore, since lithium ion conductivity is high due to the spinel structure, the 5 V-class spinel can be used at a high charge-discharge rate. In contrast, the active material containing Mn and having a layered structure has discharge capacity of 200 mAh/g or more and a charge termination voltage of about 4.8 V. However, there is a problem in using the active material at a high charge-discharge rate because of low ion conductivity. Furthermore, the structure stability of the crystal is low when being overcharged.

Thus, by mixing the 5 V-class spinel into the active material containing Mn and having a layered structure, the low ion conductivity can be compensated. Moreover, although the 5 V-class spinel has a charge termination voltage of about from 4.8 V to 5.2 V, this voltage is very close to the charge termination voltage of the active material containing Mn and having a layered structure, and thus, capacity decline due to the crystal structure instability of the layered structure when being charged is unlikely to occur.

Meanwhile, in a mixture of active materials, electrical contact between the active materials is lowered due to deterioration of an active material boundary, and resistance in an electrode tends to increase. Regarding to this point, by doping at least one selected from the group consisting of Li, B, Mg, Al, Na, and Ca to replace a part of Mn in the first active material, lifetime characteristics are improved. As a result of doping these elements, deterioration of the boundary of the first active material is suppressed, increase in contact resistance between the first active material and the second active material is suppressed, and good lifetime characteristics are obtained.

Therefore, according to the active material for a secondary battery according to the exemplary embodiment, when the active material for a secondary battery is used for a secondary battery, the secondary battery which has high capacity and operates at a high voltage and whose lifetime characteristics are improved can be provided.

[Active Material for Secondary Battery]

Hereinafter, the details of the active material for a secondary battery according to the exemplary embodiment will be described.

In the above formula (I), M1 is at least one selected from the group consisting of Ni, Cr, Fe, Co, and Cu. A high-capacity secondary battery can be obtained by containing M1. From the viewpoint of obtaining a secondary battery with a high energy density, high electromotive force, and high capacity, and increasing a capacity retention ratio, M1 preferably contains at least Ni.

In the above formula (I), M2 is at least one selected from the group consisting of Mn, Ti, and Si, and contains at least Mn. A high-capacity secondary battery can be obtained by containing M2. M2 preferably contains Ti in addition to Mn.

In the above formula (I), M3 is at least one selected from the group consisting of Li, B, Mg, Al, Na, and Ca. By containing M3, deterioration of the boundary of the first active material can be suppressed, and lifetime characteristics are improved. M3 is preferably at least one selected from the group consisting of Na, Al, and Mg.

In the above formula (I), m satisfies $0<m$. Preferably, m satisfies $0.4 \leq m<1.1$, more preferably $0.4<m<0.9$, and even more preferably $0.4<m<0.6$. When m is within the above range, insertion and desorption of Li are performed at a potential of 4.5 V or more with respect to Li.

In the above formula (I), n satisfies $0<n$. Preferably, n satisfies $0<n \leq 0.1$, more preferably $0<n \leq 0.05$, and even more preferably $0<n \leq 0.02$. When n is within the above range, lifetime characteristics are improved.

In the above formula (I), m+n satisfies $m+n<2$. Preferably, m+n satisfies $0.4 \leq m+n \leq 1.2$, more preferably $0.4 \leq m+n \leq 0.9$, and even more preferably $0.5 \leq m+n \leq 0.7$. When m+n is within the above range, lifetime characteristics are improved.

In the above formula (I), p satisfies $0 \leq p$. Due to insertion and desorption of Li by charge and discharge, p is varied. It can be varied within the range of $0 \leq p \leq 2$, can be also varied within the range of $0 \leq p \leq 1.2$, and is generally varied within the range of $0 \leq p \leq 1$.

In the above formula (II), X is at least one selected from the group consisting of Ni, Cr, Fe, Co, and Cu. A high-capacity active material is obtained by containing X. From the viewpoint of obtaining a secondary battery with a high energy density, high electromotive force, and high capacity, and increasing a capacity retention ratio, X preferably contains at least Ni.

In the above formula (II), Z is at least one selected from the group consisting of Al, Mg, B, Si, Na, Ca, and Ti. Although Z is an arbitrary element, it is preferable to contain Z because lifetime characteristics are further improved. Z is preferably at least one selected from the group consisting of Al, Mg, and B.

In the above formula (II), a satisfies $0<a$. Preferably, a satisfies $0.1 \leq a \leq 0.3$, more preferably $0.12 \leq a \leq 0.27$, and even more preferably $0.15 \leq a \leq 0.25$. When a is within the above range, a high-capacity secondary battery is obtained, and lifetime characteristics are improved.

In the above formula (II), x satisfies $0<x$. Preferably, x satisfies $0.1 \leq x<0.4$, more preferably $0.15 \leq x \leq 0.35$, and even more preferably $0.2 \leq x \leq 0.3$. When x is within the above range, a high-capacity secondary battery is obtained, and lifetime characteristics are improved.

In the above formula (II), z satisfies $0 \leq z$. Preferably, z satisfies $0<z<0.3$, more preferably $0<z \leq 0.2$, and even more preferably $0<z \leq 0.1$. When x is within the above range, lifetime characteristics are improved.

In the above formula (II), a+x+z satisfies $a+x+z<1$. Preferably, a+x+z satisfies $0.2 \leq a+x+z \leq 0.5$, more preferably $0.23 \leq a+x+z \leq 0.47$, and even more preferably $0.25 \leq a+x+z \leq 0.45$. When a+x+z is within the above range, a high-capacity secondary battery is obtained, and lifetime characteristics are improved.

In the above formula (II), q satisfies $0 \leq q$. Due to insertion and desorption of Li by charge and discharge, q is varied, and can be varied within the range of $0 \leq q \leq 1$.

A ratio of the mass of the second active material to the total of the mass of the first active material and the mass of the second active material contained in the active material for a secondary battery according to the exemplary embodiment is preferably 3 mass % or more and 90 mass % or less. Due to such a mixing ratio, lifetime characteristics are improved, and a high energy density can be secured even after repeating charge and discharge. The above ratio is more preferably 3 mass % or more and 60 mass % or less, even more preferably 4 mass % or more and 30 mass % or less, and particularly preferably 5 mass % or more and 18 mass % or less.

A preparation method of the active material for a secondary battery according to the exemplary embodiment will be described below. Raw materials of the first active material and the second active material are not particularly limited. As a Li raw material, for example, $Li_2CO_3$, LiOH, $Li_2O$, $Li_2SO_4$ or the like can be used, and lithium salts such as $Li_2CO_3$ and LiOH are preferable. As a Mn raw material, various Mn oxides such as electrolytic manganese dioxide (EMD).$Mn_2O_3$, $Mn_3O_4$, and CMD (chemical manganese dioxide), $MnCO_3$, $MnSO_4$ or the like can be used. As a Ni raw material, NiO, $Ni(OH)_2$, $NiSO_4$, $Ni(NO_3)_2$ or the like can be used. As a Ti raw material, Ti oxides such as $Ti_2O_3$ and $TiO_2$, a Ti carbonate, a Ti hydroxide, a Ti sulfate, a Ti nitrate or the like can be used. As a Cr raw material, a Cr oxide of $Cr_2O_3$ or the like, a Cr carbonate, a Cr hydroxide, a Cr sulfate, a Cr nitrate or the like can be used. As an Fe raw material, Fe oxides such as $Fe_2O_3$ and $Fe_3O_4$, $Fe(OH)_2$, $FeCO_3$, $Fe(NO_3)_2$ or the like can be used. As a Co raw material, CoO, $Co(OH)_2$, $COCO_3$ or the like can be used. As a Cu raw material, CuO, $Cu(OH)_2$, $CuCO_3$ or the like can be used. As a Si raw material, SiO, $Si(OH)_4$, or the like can be used. As an Al raw material, $Al_2O_3$, $Al(OH)_3$ or the like can be used. As a Mg raw material, MgO, $Mg(OH)_2$ or the like can be used. As a B raw material, $B_2O_3$ or the like can be used. As a Na raw material, NaOH, $Na_2O$ or the like can be used. As a Ca raw material, $Ca(OH)_2$, CaO or the like can be used.

During calcination of the above raw materials of the respective elements, element diffusion may be unlikely to occur. In this case, oxides of the respective elements may remain as heterogenous phases after the calcination of the raw materials. In order to avoid this, a mixture that is deposited as a hydroxide, a sulfate, a carbonate, a nitrate and the like after once dissolving and mixing the raw materials of the respective elements in a water solution can be used as a raw material. In addition, a mixed oxide obtained by calcining such a mixture can be used. When such a mixture is used as a raw material, the respective elements are diffused at the atomic level, and a crystal with less different phases can be easily produced.

These raw materials are weighed so as to be a desired element composition ratio and then mixed. The mixing can be performed by pulverizing and mixing with a ball mill or the like. The obtained mixed powder is calcined at a temperature of from 500° C. to 1200° C. in air or oxygen so that the first active material and the second active material are obtained. The calcination temperature is preferably a high temperature so as to diffuse the respective elements. However, when the calcination temperature is too high, oxygen deficiency occurs and battery characteristics may decrease. Therefore, the calcination temperature is preferably from 500° C. to 900° C. The active material for a secondary battery according to the exemplary embodiment is obtained by mixing the above first active material and the above second active material.

It is to be noted that, when preparing the first active material, the preparation is performed with setting p=1 in the above formula (I). In addition, when preparing the second active material, the preparation is performed with setting q=1 in the above formula (II). Although Li can be contained in each of the first active material and the second active material, in the case where Li in excess of p=1 or q=1 is added as a raw material, the excess of Li corresponds to n in the above formula (I) or a in the above formula (II).

From the viewpoint of increasing lifetime characteristics, the average particle diameter of the first active material is preferably from 0.1 μm to 50 μm. The average particle diameter of the first active material is more preferably from 1 μm to 30 μm. From the viewpoint of increasing lifetime characteristics, the average particle diameter of the second active material is preferably from 0.1 μm to 50 μm. The average particle diameter of the second active material is more preferably from 0.5 μm to 20 μm. It is to be noted that the average particle diameters of the first active material and the second active material are values measured by a laser diffraction particle size analyzer.

Preferably, the specific surface area of the active material for a secondary battery according to the exemplary embodiment is 0.01 $m^2/g$ or more and 20 $m^2/g$ or less. When the specific surface area is 0.01 $m^2/g$ or more, ion conductivity between the electrolyte solution and the active material for a secondary battery increases. Furthermore, when the specific surface area is 20 $m^2/g$ or less, the required amount of a binder is small and a capacitance density increases. More preferably, the specific surface area of the active material for a secondary battery is 0.05 $m^2/g$ or more and 10 $m^2/g$ or less. It is to be noted that the specific surface area is a value measured by a BET method.

Although the active material for a secondary battery according to the exemplary embodiment can be used as a positive electrode active material for a secondary battery or a negative electrode active material for a secondary battery, the active material for a secondary battery according to the exemplary embodiment is preferably used as a positive electrode active material for a secondary battery. In addition, the active material for a secondary battery according to the exemplary embodiment can be used for each of a lithium secondary battery and a lithium-ion secondary battery.

[Method for Producing Active Material for Secondary Battery]

A method for producing an active material for a secondary battery according to the exemplary embodiment includes mixing a first active material represented by the following formula (I)

$$Li_p[M1_mM2_{2-m-n}M3_n]O_4 \qquad (I)$$

wherein, M1 is at least one selected from the group consisting of Ni, Cr, Fe, Co, and Cu; M2 is at least one selected from the group consisting of Mn, Ti, and Si, and contains at least Mn; M3 is at least one selected from the group consisting of Li, B, Mg, Al, Na, and Ca; and 0≤p, 0<m, 0<n, and m+n<2; and a second active material represented by the following formula (II)

$$Li_q[Li_aX_xZ_zMn_{1-a-x-z}]O_2 \qquad (II)$$

wherein, X is at least one selected from the group consisting of Ni, Cr, Fe, Co, and Cu; Z is at least one selected from the group consisting of Al, Mg, B, Si, Na, Ca, and Ti; and 0≤q, 0<a, 0<x, 0≤z, and a+x+z<1.

The preparation method of the first active material and the second active material is as described above. The active material for a secondary battery according to the exemplary embodiment can be produced by mixing the above first active material and the above second active material. A mixing method of the first active material and the second active material is not particularly limited.

[Electrode for Secondary Battery]

An electrode for a secondary battery according to the exemplary embodiment includes the active material for a secondary battery according to the exemplary embodiment. The electrode for a secondary battery according to the exemplary embodiment can be prepared by applying the active material for a secondary battery according to the exemplary embodiment onto an electrode current collector. For example, in the case where a positive electrode for a secondary battery is prepared by using the active material for a secondary battery according to the exemplary embodiment, the active material for a secondary battery according to the exemplary embodiment, a conductivity-imparting agent, and a binder are mixed and the mixture is then applied onto a positive electrode current collector so that the positive electrode for a secondary battery can be prepared. For example, a carbon material as well as a metal substance such as Al, and a powder etc. of a conductive oxide can be used as the conductivity-imparting agent. As the binder, polyvinylidene fluoride (PVDF), an acrylic resin, a polytetrafluoroethylene resin or the like can be used. As the positive electrode current collector, a metal thin film mainly containing Al or the like can be used.

The additive amount of the conductivity-imparting agent can be from 1 to 10 mass %. When the additive amount is 1 mass % or more, sufficient conductivity can be maintained. Furthermore, when the additive amount is 10 mass % or less, a ratio of the active material mass can be increased, and thus, capacity per mass can be increased. The additive amount of the binder can be from 1 to 10 mass %. When the additive amount is 1 mass % or more, the occurrence of electrode peeling can be prevented. Furthermore, when the additive amount is 10 mass % or less, a ratio of the active material mass can be increased, and thus, capacity per mass can be increased.

It is to be noted that, also in the case where a negative electrode for a secondary battery is prepared by using the active material for a secondary battery according to the exemplary embodiment, the negative electrode for a secondary battery can be prepared in accordance with the same method as the method for preparing the positive electrode for a secondary battery.

[Secondary Battery]

A secondary battery according to the exemplary embodiment includes the electrode for a secondary battery according to the exemplary embodiment. For example, the secondary battery according to the exemplary embodiment includes the positive electrode for a secondary battery which is the electrode for a secondary battery according to the exemplary embodiment, and a negative electrode containing the negative electrode active material capable of absorbing and releasing lithium. A separator is sandwiched between the positive electrode for a secondary battery and the negative electrode so as not to produce electrical connection, the positive electrode for a secondary battery and the negative electrode are immersed in a lithium-ion conducting electrolyte solution, and these are tightly sealed within a battery case as an outer package.

One example of the configuration of the secondary battery according to the exemplary embodiment is shown in FIG. 1. A positive electrode active material layer 1 containing the active material for a secondary battery according to the exemplary embodiment is formed on a positive electrode current collector 3 to configure a positive electrode. A negative electrode active material layer 2 is formed on a negative electrode current collector 4 to configure a negative electrode. The positive electrode and the negative electrode are arranged to be opposed to each other via a separator 5 with being immersed in an electrolyte solution. These are housed in outer packages 6, 7. The positive electrode is connected to a positive electrode tab 9 and the negative electrode is connected to a negative electrode tab 8.

By applying a voltage to the positive electrode and the negative electrode, lithium ions are desorbed from the positive electrode active material and the lithium ions are absorbed into the negative electrode active material, thereby getting into a charged state. Contrary to when being charged, by causing electrical contact between the positive electrode and the negative electrode outside the battery, lithium ions are released from the negative electrode active material and the lithium ions are absorbed into the positive electrode active material, thereby causing discharge.

As the electrolyte solution used for the secondary battery according to the exemplary embodiment, a solution prepared by dissolving a lithium salt as a supporting salt in a solvent can be used. As the solvent, cyclic carbonates such as ethylene carbonate (EC), propylene carbonate (PC), butylene carbonate (BC), and vinylene carbonate (VC), chain carbonates such as dimethyl carbonate (DMC), ethyl methyl carbonate (EMC), diethyl carbonate (DEC), and dipropyl carbonate (DPC), aliphatic carboxylic acid esters such as methyl formate, methyl acetate, and ethyl propionate, γ-lactones such as γ-butyrolactone, chain ethers such as 1,2-diethoxyethane (DEE) and ethoxy methoxy ethane (EME), cyclic ethers such as tetrahydrofuran and 2-methyltetrahydrofuran, and aprotic organic solvents such as dimethylsulfoxide, 1,3-dioxolane, formamide, acetamide, dimethylformamide, dioxolane, acetonitrile, propylnitrile, nitromethane, ethylmonoglyme, phosphate triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propane sultone, anisole, N-methylpyrrolidone, and a fluorinated carboxylic acid ester can be used. These may be used alone or in combination with two or more thereof. Among them, from the viewpoint of the stability at a high voltage and the viscosity of the solvent, a mixed solution of a cyclic carbonate and a chain carbonate is preferably used as the solvent.

Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$, $LiN(C_2F_5SO_2)_2$, $LiB_{10}Cl_{10}$, lower aliphatic lithium carboxylate, chloroborane lithium, lithium tetraphenylborate, LiBr, LiI, LiSCN, LiCl, and imides. These may be used alone or in combination with two or more thereof.

The concentration of the lithium salt as a supporting salt can be, for example, 0.5 to 1.5 mol/L. When the concentration of the lithium salt is 0.5 mol/L or more, sufficient electric conductivity can be obtained. Moreover, when the concentration of the lithium salt is 1.5 mol/L or less, increase in the density and the viscosity can be suppressed.

A polymer electrolyte in which an electrolyte solution is solidified to be in a gel state by adding a polymer or the like to a solvent of the electrolyte solution also may be used.

As the negative electrode active material, a material capable of absorbing and releasing lithium can be used. As the negative electrode active material, for example, the active material for a secondary battery according to the exemplary embodiment, graphite, hard carbon, soft carbon, carbon materials such as amorphous carbon, Li metal, Si, Sn, Al, Si oxides such as SiO, a Sn oxide, $Li_4Ti_5O_{12}$, Ti oxides such as $TiO_2$, a V-containing oxide, an Sb-containing oxide, an Fe-containing oxide, a Co-containing oxide or the like can be used. These negative electrode active materials may be used alone or in combination with two or more thereof. In the secondary battery according to the exemplary embodiment, the negative electrode active material is preferably at least one selected from the group consisting of graphite, SiO, Si, hard carbon, and $Li_4Ti_5O_{12}$.

The negative electrode can be prepared, for example, by mixing the negative electrode active material, a conductivity-imparting agent, and a binder, and then applying the mixture onto a negative electrode current collector. As the conductivity-imparting agent, for example, a carbon material as well as a powder etc. of a conductive oxide can be used. As the binder, polyvinylidene fluoride (PVDF), an acrylic resin, a styrene-butadiene rubber, an imide resin, an imidamide resin, a polytetrafluoroethylene resin or the like can be used. As the negative electrode current collector, a metal thin film mainly containing Al, Cu or the like can be used.

The secondary battery according to the exemplary embodiment can be produced by assembling the electrode for a secondary battery according to the exemplary embodiment. For example, under a dry air or inert gas atmosphere, the positive electrode for a secondary battery which is the electrode for a secondary battery according to the exemplary embodiment and the negative electrode are arranged to be opposed to each other via a separator without electrical contact. As the separator, a microporous film made from polyethylene, polypropylene (PP), polyimide, polyamide or the like can be used.

The resulting object in which the positive electrode and the negative electrode are arranged to be opposed to each other with the separator sandwiched therebetween is formed into a cylindrical state or a laminated state. This object is housed in an outer package and immersed in the electrolyte solution so as to allow both of the positive electrode active material and the negative electrode active material to be in contact with the electrolyte solution. As the outer package, a battery can, a laminated film made from a lamination of a synthetic resin and metal foil, or the like can be used. A positive electrode tab and a negative electrode tab are connected to the positive electrode and the negative electrode, respectively, these electrode tabs are made to be connected to the outside of the outer package, and the outer package is tightly sealed so that the secondary battery can be produced.

Examples of the configuration of the positive electrode and the negative electrode which are arranged to be opposed to each other with the separator sandwiched therebetween include a wound type, a laminate type or the like. Examples of the form of the secondary battery include a coin type, a laminate type or the like. Examples of the shape of the secondary battery include a square type, a cylindrical type or the like.

EXAMPLES

Example 1

Preparation of First Active Material

As the first active material, $Li[Ni_{0.5}Mn_{1.45}Al_{0.05}]O_4$ was prepared. As the raw materials, $MnO_2$, NiO, $Al(OH)_3$, and $Li_2CO_3$ were weighed so as to be a desired element composition ratio, and they were pulverized and mixed. The powder after mixing was calcined at from 500 to 1000° C. for 12 hours. Thus, the first active material was prepared. The crystal structure of the first active material was evaluated by X-ray diffraction, and it was confirmed to be an almost single phase spinel structure. In addition, the element composition of the first active material was determined by ICP, and it corresponded to the element composition calculated based on the used amount of the raw materials.

(Preparation of Second Active Material)

As the second active material, $Li[Li_{0.12}Ni_{0.25}Mn_{0.63}]O_2$ was prepared. As the raw materials, $MnO_2$, NiO, and $Li_2CO_3$ were weighed so as to be a desired element composition ratio, and they were pulverized and mixed. The powder after mixing was calcined at from 500 to 1000° C. for 12 hours. Thus, the second active material was prepared. The crystal structure of the second active material was evaluated by X-ray diffraction, and it was confirmed to be an almost single phase layered structure. In addition, the element composition of the second active material was determined by ICP, and it corresponded to the element composition calculated based on the used amount of the raw materials.

(Preparation of Positive Electrode)

The first active material and the second active material were mixed such that a ratio of the mass of the second active material to the total of the mass of the first active material and the mass of the second active material is 20 mass %. In the present example, the mixture was used as the positive electrode active material. The above mixture and carbon as the conductivity-imparting agent were mixed, and dispersed in N-methylpyrrolidone in which polyvinylidene fluoride (PVDF) as the binder is dissolved to obtain slurry. A mass ratio of the above mixture, the above conductivity-imparting agent, and the above binder was 90/5/5. The slurry was applied onto an Al current collector. The thickness of the applied film was adjusted such that a first charge capacity of the positive electrode is 2 mAh/cm². Then, after drying for 12 hours in a vacuum, pressure molding was performed at 3 t/cm². This was cut into a square of 20 mm by 20 mm to obtain the positive electrode.

(Preparation of Negative Electrode)

Graphite was used as the negative electrode active material. According to the same method as the positive electrode, slurry was prepared by setting a mass ratio of the negative electrode active material, the conductivity-imparting agent, and the binder to 91/1/8, and the slurry was applied onto a Cu current collector. The thickness of the applied film was adjusted such that a first charge capacity of the negative electrode is 2.2 mAh/cm². Then, after drying for 12 hours in a vacuum, pressure molding was performed at 1.5 t/cm². This was cut into a square of 20 mm by 20 mm to obtain the negative electrode.

(Preparation of Secondary Battery)

The positive electrode and the negative electrode were arranged to be opposed to each other via a separator without electrical contact, and arranged in a coin cell. The coin cell was filled with an electrolyte solution and was tightly sealed. As the separator, a porous film made from polypropylene was used. As the electrolyte solution, a solution in which $LiPF_6$ as the supporting salt is dissolved at a concentration of 1 mol/l in a solvent prepared by mixing ethylene carbonate (EC) and dimethyl carbonate (DMC) at a ratio of 30:70 (vol. %) was used. Thus, the secondary battery was prepared.

(Measurement of Capacity Retention Ratio)

The prepared secondary battery was put in a thermostat bath of 45° C. The secondary battery was charged to 4.8 V by a constant current of 8 mA charging current, and then, constant voltage charge was performed at 4.8 V, wherein the total of charging time per one time was set to 2 hours. Then, the secondary battery was discharged to 3.0 V by a constant current of 8 mA discharging current. The charge-discharge cycle was repeated 200 times. A capacity retention ratio, i.e., a ratio of discharge capacity at the 200th cycle to discharge capacity at the first time was calculated. The result is shown in Table 1.

Examples 2 to 26, Comparative Examples 1, 2

The second active material having the composition shown in Table 1 was prepared in accordance with the same method as Example 1. The secondary battery was prepared and evaluated in the same manner as Example 1 except using the above second active material. The result is shown in Table 1. $MnO_2$ as the Mn raw material, NiO as the Ni raw material, $Li_2CO_3$ as the Li raw material, $TiO_2$ as the Ti raw material, $Cr_2O_3$ as the Cr raw material, CoO as the Co raw material, $Al(OH)_3$ as the Al raw material, $Mg(OH)_2$ as the Mg raw material, $B_2O_3$ as the B raw material, $Na(OH)_2$ as the Na raw material, SiO as the Si raw material, $Ca(OH)_2$ as the Ca raw material, $Fe_2O_3$ as the Fe raw material, and CuO as the Cu raw material were used. Moreover, the crystal structure of the second active material prepared in Examples 2 to 26, and Comparative Examples 1, 2 was evaluated by X-ray diffraction, and it was confirmed to be an almost single phase layered structure. Furthermore, the element composition of the second active material prepared in Examples 2 to 26, and Comparative Examples 1, 2 was determined by ICP, and it corresponded to the element composition calculated based on the used amount of the raw materials.

TABLE 1

| | Second active material | Capacity retention ratio [%] |
|---|---|---|
| Example 1 | $Li[Li_{0.12}Ni_{0.25}Mn_{0.63}]O_2$ | 72 |
| Example 2 | $Li[Li_{0.15}Ni_{0.25}Mn_{0.6}]O_2$ | 72 |
| Example 3 | $Li[Li_{0.2}Ni_{0.25}Mn_{0.55}]O_2$ | 73 |
| Example 4 | $Li[Li_{0.25}Ni_{0.25}Mn_{0.5}]O_2$ | 68 |
| Example 5 | $Li[Li_{0.3}Ni_{0.2}Mn_{0.5}]O_2$ | 66 |
| Example 6 | $Li[Li_{0.2}Ni_{0.15}Mn_{0.65}]O_2$ | 69 |
| Example 7 | $Li[Li_{0.2}Ni_{0.25}Mn_{0.55}]O_2$ | 72 |
| Example 8 | $Li[Li_{0.15}Ni_{0.35}Mn_{0.5}]O_2$ | 68 |
| Example 9 | $Li[Li_{0.18}Ni_{0.2}Co_{0.1}Mn_{0.52}]O_2$ | 74 |
| Example 10 | $Li[Li_{0.15}Ni_{0.25}Al_{0.05}Mn_{0.55}]O_2$ | 72 |
| Example 11 | $Li[Li_{0.15}Ni_{0.25}Mg_{0.05}Mn_{0.55}]O_2$ | 75 |
| Example 12 | $Li[Li_{0.18}Ni_{0.2}B_{0.02}Mn_{0.6}]O_2$ | 73 |
| Example 13 | $Li[Li_{0.18}Ni_{0.2}Co_{0.05}B_{0.02}Mn_{0.55}]O_2$ | 74 |
| Example 14 | $Li[Li_{0.15}Ni_{0.2}Na_{0.05}Mn_{0.6}]O_2$ | 72 |
| Example 15 | $Li[Li_{0.15}Ni_{0.2}Ca_{0.05}Mn_{0.6}]O_2$ | 73 |
| Example 16 | $Li[Li_{0.15}Ni_{0.2}Si_{0.05}Mn_{0.6}]O_2$ | 72 |
| Example 17 | $Li[Li_{0.15}Ni_{0.2}Ti_{0.1}Mn_{0.55}]O_2$ | 71 |
| Example 18 | $Li[Li_{0.15}Ni_{0.2}Fe_{0.02}Mn_{0.63}]O_2$ | 70 |
| Example 19 | $Li[Li_{0.15}Ni_{0.2}Cu_{0.02}Mn_{0.63}]O_2$ | 73 |
| Example 20 | $Li[Li_{0.15}Cr_{0.2}Mn_{0.65}]O_2$ | 70 |
| Example 21 | $Li[Li_{0.05}Ni_{0.4}Co_{0.15}Mn_{0.4}]O_2$ | 46 |
| Example 22 | $Li[Li_{0.05}Ni_{0.25}Mn_{0.7}]O_2$ | 48 |
| Example 23 | $Li[Li_{0.35}Ni_{0.15}Mn_{0.5}]O_2$ | 48 |
| Example 24 | $Li[Li_{0.2}Ni_{0.08}Mn_{0.72}]O_2$ | 48 |

TABLE 1-continued

|  | Second active material | Capacity retention ratio [%] |
|---|---|---|
| Example 25 | Li[Li$_{0.15}$Ni$_{0.45}$Mn$_{0.4}$]O$_2$ | 49 |
| Example 26 | Li[Li$_{0.05}$Ni$_{0.12}$Mn$_{0.83}$]O$_2$ | 48 |
| Comparative Example 1 | Li[Ni$_{0.5}$Mn$_{0.5}$]O$_2$ | 35 |
| Comparative Example 2 | Li[Ni$_{0.8}$Co$_{0.15}$Al$_{0.05}$]O$_2$ | 30 |

As shown in Table 1, in Examples 1 to 26 using the second active material satisfying the above formula (II), a high capacity retention ratio, which means a good lifetime characteristics, was attained. In contrast, in Comparative Examples 1, 2 using the second active material not satisfying the above formula (II), good lifetime characteristics were not attained.

Examples 27 to 49, Comparative Examples 3, 4

As the first active material, the active material shown in Table 2 was prepared in accordance with the same method as Example 1 by using the same raw materials as the raw materials shown in Examples 2 to 26, and Comparative Examples 1, 2. Furthermore, as the second active material, Li[Li$_{0.2}$Ni$_{0.25}$Mn$_{0.55}$]O$_2$ was prepared in accordance with the same method as Example 1 by using the same raw materials as the raw materials shown in Examples 2 to 26, and Comparative Examples 1, 2. The secondary battery was prepared and evaluated in the same manner as Example 1 except using the above first active material and the above second active material. The result is shown in Table 2.

TABLE 2

|  | First active material | Capacity retention ratio [%] |
|---|---|---|
| Example 27 | Li[Ni$_{0.5}$Mn$_{1.48}$Al$_{0.02}$]O$_4$ | 72 |
| Example 28 | Li[Ni$_{0.5}$Mn$_{1.4}$Al$_{0.1}$]O$_4$ | 71 |
| Example 29 | Li[Ni$_{0.5}$Mn$_{1.48}$Mg$_{0.02}$]O$_4$ | 75 |
| Example 30 | Li[Ni$_{0.5}$Mn$_{1.48}$Na$_{0.02}$]O$_4$ | 73 |
| Example 31 | Li[Ni$_{0.5}$Mn$_{1.48}$Li$_{0.02}$]O$_4$ | 70 |
| Example 32 | Li[Ni$_{0.5}$Mn$_{1.48}$B$_{0.02}$]O$_4$ | 73 |
| Example 33 | Li[Ni$_{0.5}$Mn$_{1.48}$Ca$_{0.02}$]O$_4$ | 71 |
| Example 34 | Li[Ni$_{0.5}$Mn$_{1.33}$Ti$_{0.15}$Al$_{0.02}$]O$_4$ | 76 |
| Example 35 | Li[Ni$_{0.5}$Mn$_{1.43}$Si$_{0.05}$Al$_{0.02}$]O$_4$ | 74 |
| Example 36 | Li[Ni$_{0.5}$Mn$_{1.3}$Ti$_{0.19}$Na$_{0.01}$]O$_4$ | 78 |
| Example 37 | Li[Ni$_{0.5}$Mn$_{1.3}$Ti$_{0.18}$Mg$_{0.02}$]O$_4$ | 79 |
| Example 38 | Li[Ni$_{0.5}$Mn$_{1.2}$Ti$_{0.28}$B$_{0.02}$]O$_4$ | 76 |
| Example 39 | Li[Ni$_{0.5}$Mn$_{1.43}$Si$_{0.05}$B$_{0.02}$]O$_4$ | 71 |
| Example 40 | Li[Ni$_{0.4}$Mn$_{1.53}$Ti$_{0.05}$B$_{0.02}$]O$_4$ | 70 |
| Example 41 | Li[Ni$_{0.45}$Fe$_{0.05}$Mn$_{1.48}$B$_{0.02}$]O$_4$ | 72 |
| Example 42 | Li[Ni$_{0.45}$Co$_{0.1}$Mn$_{1.43}$B$_{0.02}$]O$_4$ | 71 |
| Example 43 | Li[Ni$_{0.3}$Co$_{0.4}$Mn$_{1.28}$B$_{0.02}$]O$_4$ | 70 |
| Example 44 | Li[Ni$_{0.45}$Cu$_{0.05}$Mn$_{1.48}$B$_{0.02}$]O$_4$ | 73 |
| Example 45 | Li[Ni$_{0.45}$Cr$_{0.1}$Mn$_{1.43}$B$_{0.02}$]O$_4$ | 71 |
| Example 46 | Li[Ni$_{0.2}$Cr$_{0.6}$Mn$_{1.18}$B$_{0.02}$]O$_4$ | 70 |
| Example 47 | Li[Cr$_{0.95}$Mn$_{1.03}$Mg$_{0.02}$]O$_4$ | 70 |
| Example 48 | Li[Ni$_{0.5}$Mn$_{1.2}$Ti$_{0.15}$Mg$_{0.15}$]O$_4$ | 66 |
| Example 49 | Li[Ni$_{0.5}$Mn$_{1.13}$Ti$_{0.35}$Mg$_{0.02}$]O$_4$ | 66 |
| Comparative Example 3 | Li[Ni$_{0.5}$Mn$_{1.5}$]O$_4$ | 54 |
| Comparative Example 4 | Li[Ni$_{0.5}$Mn$_{1.35}$Ti$_{0.15}$]O$_4$ | 59 |

As shown in Table 2, a capacity retention ratio in Examples 27 to 49 using the first active material satisfying the above formula (I) was higher than those in Comparative Examples 3, 4. It is presumed that, by adding M3 that is at least one selected from the group consisting of Li, B, Mg, Al, Na, and Ca to the first active material, deterioration of the boundary of the first active material was suppressed to maintain electrical contact with the second active material having low conductivity, so that lifetime characteristics were improved.

Examples 50 to 57, Comparative Examples 5, 6

As the first active material, Li[Ni$_{0.5}$Mn$_{1.36}$Ti$_{0.12}$Mg$_{0.02}$]O$_4$ was prepared in accordance with the same method as Example 1 by using the same raw materials as the raw materials shown in Examples 2 to 26, and Comparative Examples 1, 2. Furthermore, as the second active material, Li[Li$_{0.15}$Ni$_{0.25}$Al$_{0.03}$Mn$_{0.57}$]O$_2$ was prepared in accordance with the same method as Example 1 by using the same raw materials as the raw materials shown in Examples 2 to 26, and Comparative Examples 1, 2. The secondary battery was prepared and evaluated in the same manner as Example 1, except that the first active material and the second active material were mixed at a ratio shown in Table 3 and used as the positive electrode active material.

A capacity retention ratio and discharge energy per active material mass at the 200th cycle (battery capacity×discharge average voltage of battery) are shown in Table 3. It is to be noted that the active material mass means the total mass of the mass of the first active material and the mass of the second active material.

TABLE 3

|  | Mass ratio of first active material [mass %] | Mass ratio of second active material [mass %] | Capacity retention ratio [%] | Discharge energy per active material mass at 200th cycle [Wh/kg] |
|---|---|---|---|---|
| Comparative Example 5 | 100 | 0 | 65 | 421 |
| Example 50 | 97 | 3 | 72 | 448 |
| Example 51 | 95 | 5 | 76 | 462 |
| Example 52 | 90 | 10 | 78 | 486 |
| Example 53 | 80 | 20 | 79 | 479 |
| Example 54 | 60 | 40 | 76 | 464 |
| Example 55 | 40 | 60 | 73 | 452 |
| Example 56 | 20 | 80 | 72 | 442 |
| Example 57 | 10 | 90 | 71 | 438 |
| Comparative Example 6 | 0 | 100 | 54 | 263 |

As shown in Table 3, in Examples 50 to 57 using both of the first positive electrode active material and the second positive electrode active material, the capacity retention ratio was high and the discharge energy after the 200th cycle was also high.

Examples 58 to 61, Comparative Examples 7 to 10

As the first active material, Li[Ni$_{0.48}$Co$_{0.04}$Mn$_{1.47}$B$_{0.01}$]O$_4$ was prepared in accordance with the same method as Example 1 by using the same raw materials as the raw materials shown in Examples 2 to 26, and Comparative Examples 1, 2. Furthermore, as the second active material, Li[Li$_{0.15}$Ni$_{0.25}$Al$_{0.03}$Mn$_{0.57}$]O$_2$ was prepared in accordance with the same method as Example 1 by using the same raw materials as the raw materials shown in Examples 2 to 26, and Comparative Examples 1, 2. The first active material and the second active material were mixed at a ratio shown in Table 4 and used as the positive electrode active material. In addition, a material listed in Table 4 was used as the negative electrode active material. Except them, the secondary battery was prepared and evaluated in the same manner as Example 1. It is to be noted that, in Example 61 and Comparative Example 10 using Li$_4$Ti$_5$O$_{12}$ as the negative electrode active material, a charge voltage was set to 3.3 V and discharge voltage was set to 1.5 V in the measurement of the capacity retention ratio. The result is shown in Table 4.

TABLE 4

| | Mass ratio of first active material [mass %] | Mass ratio of second active material [mass %] | Negative electrode active material | Capacity retention ratio [%] | Discharge energy per active material mass at 200th cycle [Wh/kg] |
|---|---|---|---|---|---|
| Example 58 | 80 | 20 | SiO | 82 | 441 |
| Comparative Example 7 | 100 | 0 | SiO | 60 | 315 |
| Example 59 | 80 | 20 | Si | 73 | 347 |
| Comparative Example 8 | 100 | 0 | Si | 56 | 252 |
| Example 60 | 80 | 20 | hard carbon | 83 | 416 |
| Comparative Example 9 | 100 | 0 | hard carbon | 67 | 323 |
| Example 61 | 80 | 20 | $Li_4Ti_5O_{12}$ | 72 | 383 |
| Comparative Example 10 | 100 | 0 | $Li_4Ti_5O_{12}$ | 56 | 315 |

As shown in Table 4, in Examples 58 to 61 using both of the first positive electrode active material and the second positive electrode active material, when any active material is used as the negative electrode active material, the capacity retention ratio was high and the discharge energy after the 200th cycle was also high.

This application claims priority based on Japanese Patent Application No. 2011-154753 filed on Jul. 13, 2011, the disclosure of which is incorporated herein in its entirety.

Heretofore, although the invention of the present application has been described with reference to the exemplary embodiment and examples, the invention of the present application is not limited to the above-described exemplary embodiment and examples. Various changes that can be understood by those skilled in the art can be made in the configuration and details of the invention of the present application within the scope of the invention of the present application.

REFERENCE SIGNS LIST

1 positive electrode active material layer
2 negative electrode active material layer
3 positive electrode current collector
4 negative electrode current collector
5 separator
6, 7 outer packages
8 negative electrode tab
9 positive electrode tab

The invention claimed is:

1. An active material for a secondary battery comprising:
    a first active material represented by the following formula (I)

$$Li_p[M1_mM2_{2-m-n}M3_n]O_4 \quad (I)$$

wherein, M1 is at least one selected from the group consisting of Ni, Cr, Fe, Co, and Cu; M2 is at least one selected from the group consisting of Mn, Ti, and Si, and comprises at least Mn; M3 is at least one selected from the group consisting of Li, B, Al; and 0≤p, 0<m, 0<n, and m+n<2; and a second active material represented by the following formula (II)

$$Li_q[Li_aX_xZ_zMn_{1-a-x-z}]O_2 \quad (II)$$

wherein, X is at least one selected from the group consisting of Ni, Cr, Fe, Co, and Cu; Z is at least one selected from the group consisting of Al, Mg, B, Si, Na, Ca, and Ti; and 0≤q, 0<a, 0<x, 0<z<0.3, and a+x+z<1.

2. The active material for a secondary battery according to claim 1, wherein 0.4≤m<1.1 in the formula (I).

3. The active material for a secondary battery according to claim 1, wherein 0<n≤0.1 in the formula (I).

4. The active material for a secondary battery according to claim 1, wherein 0≤p≤2 in the formula (I).

5. The active material for a secondary battery according to claim 1, wherein 0.1≤a≤0.3 in the formula (II).

6. The active material for a secondary battery according to claim 1, wherein 0.1≤x<0.4 in the formula (II).

7. The active material for a secondary battery according to claim 1, wherein 0.2≤a+x+z≤0.5 in the formula (II).

8. The active material for a secondary battery according to claim 1, wherein 0≤q≤1 in the formula (II).

9. The active material for a secondary battery according to claim 1, wherein M1 comprises at least Ni in the formula (I).

10. The active material for a secondary battery according to claim 1, wherein X comprises at least Ni in the formula (II).

11. The active material for a secondary battery according to claim 1, wherein the mass of the second active material to the total mass of the first active material and the second active material ranges from at least 3 mass % and up to 90 mass %.

12. The active material for a secondary battery according to claim 1, which is a positive electrode.

13. An electrode for a secondary battery comprising the active material for a secondary battery according to claim 1.

14. A secondary battery comprising the electrode for a secondary battery according to claim 13.

15. The secondary battery according to claim 14 comprising:
    a negative electrode comprising a negative electrode active material, wherein the negative electrode active material is at least one selected from the group consisting of graphite, SiO, Si, hard carbon, and $Li_4Ti_5O_{12}$.

16. A method for producing an active material for a secondary battery comprising mixing a first active material represented by the following formula (I)

$$Li_p[M1_mM2_{2-m-n}M3_n]O_4 \quad (I)$$

wherein, M1 is at least one selected from the group consisting of Ni, Cr, Fe, Co, and Cu; M2 is at least one selected from the group consisting of Mn, Ti, and Si, and comprises at least Mn; M3 is at least one selected from the group consisting of Li, B, Al; and 0≤p, 0<m, 0<n, and m+n<2; and a second active material represented by the following formula (II)

$$Li_q[Li_aX_xZ_zMn_{1-a-x-z}]O_2 \quad (II)$$

wherein, X is at least one selected from the group consisting of Ni, Cr, Fe, Co, and Cu; Z is at least one selected from the group consisting of Al, Mg, B, Si, Na, Ca, and Ti; and 0≤q, 0<a, 0<x, 0<z<0.3, and a+x+z<1.

17. The method according to claim 16, wherein in formula (I): 0.4≤m<1.1; 0<n≤0.1; and 0≤p≤2.

18. The method according to claim 16, wherein in formula (II): 0.1≤a≤0.3; 0.1≤x<0.4; 0.2≤a+x+z≤0.5; and 0≤q≤1.

19. The method according to claim 16, wherein M1 comprises at least Ni in the formula (I) and X comprises at least Ni in the formula (II).

* * * * *